(12) United States Patent
Sacripante et al.

(10) Patent No.: US 6,664,015 B1
(45) Date of Patent: Dec. 16, 2003

(54) SULFONATED POLYESTER-SILOXANE RESIN

(75) Inventors: Guerino G. Sacripante, Oakville (CA); Gwynne E. McAneney, Burlington (CA); T. Brian McAneney, Burlington (CA)

(73) Assignee: Xerox Corporation, Stamford, CT (US)

( * ) Notice: Subject to any disclaimer, the term of this patent is extended or adjusted under 35 U.S.C. 154(b) by 1 day.

(21) Appl. No.: 10/171,367

(22) Filed: Jun. 12, 2002

(51) Int. Cl.[7] ............................................. G03G 9/097
(52) U.S. Cl. ................................ 430/108.1; 430/109.4
(58) Field of Search ........................... 430/108.1, 109.4

(56) References Cited

U.S. PATENT DOCUMENTS

| | | | |
|---|---|---|---|
| 3,018,272 A | 1/1962 | Griffing et al. ............... 260/75 |
| 3,563,942 A | 2/1971 | Heiberger .................. 260/29.2 |
| 3,734,874 A | 5/1973 | Kibler et al. ............ 260/29.2 E |
| 4,340,519 A | 7/1982 | Kotera et al. ........... 260/29.2 E |
| 4,465,712 A | 8/1984 | McVie ....................... 427/387 |
| 4,525,524 A | 6/1985 | Tung et al. ................. 524/601 |
| 4,945,147 A | 7/1990 | Policastro et al. ............. 528/26 |
| 5,262,492 A | 11/1993 | Hanada et al. ............... 525/415 |
| 5,348,832 A | 9/1994 | Sacripante et al. .......... 430/109 |
| 5,354,815 A | 10/1994 | Barringer, Jr. et al. ...... 525/431 |
| 5,401,601 A * | 3/1995 | Sacripante et al. ...... 430/106.6 |
| 5,466,554 A | 11/1995 | Sacripante et al. ......... 430/110 |
| 5,593,807 A | 1/1997 | Sacripante et al. ......... 430/137 |
| 5,604,076 A | 2/1997 | Patel et al. .................. 430/137 |
| 5,648,193 A | 7/1997 | Patel et al. .................. 430/137 |
| 5,658,704 A | 8/1997 | Patel et al. .................. 430/137 |
| 5,660,965 A | 8/1997 | Mychajlowskij et al. ... 430/137 |
| 5,684,063 A | 11/1997 | Patel et al. .................. 523/161 |
| 5,698,223 A | 12/1997 | Mychajlowskij et al. ... 430/137 |
| 5,929,160 A | 7/1999 | Krepski et al. ............. 524/590 |
| 5,932,677 A | 8/1999 | Hoover et al. ................. 528/26 |
| 6,432,601 B1 * | 8/2002 | Foucher et al. .......... 430/109.4 |
| 6,541,175 B1 * | 4/2003 | Jiang et al. ............ 430/137.14 |

* cited by examiner

*Primary Examiner*—John Goodrow
(74) *Attorney, Agent, or Firm*—E. D. Palazzo

(57) ABSTRACT

A toner comprised of colorant and a sulfonated polyester-siloxane polymer generated from the reaction of at least one organic diol monomer, at least one organic diacid or at least one diester monomer, at least one carbinol carboxy terminated polydimethyl siloxane, and at least one ion salt of a sulfonate difunctional monomer.

25 Claims, No Drawings

SULFONATED POLYESTER-SILOXANE RESIN

CROSS REFERENCE

Illustrated in copending application U.S. Ser. No. 10/170,993, filed Jun. 12, 2002, the disclosure of which is totally incorporated herein by reference, is a sulfonated polyester siloxane polymer generated from the reaction of at least one organic diol monomer, at least one organic diacid monomer or at least one diester monomer, at least one carbinol carboxy terminated polydimethylsiloxane, and at least one ion salt of a sulfonate difunctional monomer.

BACKGROUND

The present invention is generally directed to polymer components, and more specifically, the present invention is directed to a resin comprised of a polyester-siloxane copolymer backbone with an ionic hydrogen sulfonate, a hydrophilic hydrogen sulfonate, or a metalized sulfonate group, and wherein the metal is, for example, zinc, copper, manganese, chromium, iron, zirconium or an alkali metal such as sodium, lithium, potassium, rubidium cesium, beryllium, magnesium, calcium, strontium, barium, and/or mixtures thereof. More specifically, the resin composition is comprised of a hydrogen or metalized sulfo-polyester-siloxane copolymer of the formula

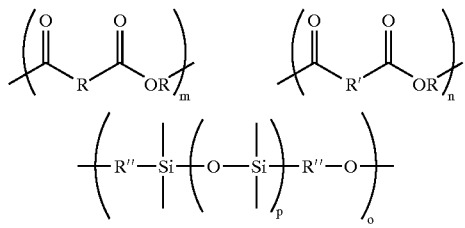

wherein the segments m, n and o represent the random units of the polymer or resin, and wherein the sum of m, n, and o are, for example, from about 10 to about 10,000, and more specifically, from about 100 to about 5,000, and yet more specifically, from about 1,000 to about 4,000, and p represents the repeating segment of the polydimethylsiloxane and is, for example, from about 100 to about 10,000, more specifically from about 100 to about 7,000, and yet more specifically, from about 1,000 to about 5,000 units; and wherein R is an alkylene with, for example, from about 1 to about 16 carbon atoms, such as ethylene, propylene, butylene, pentylene, hexylene, octylene, 1,2-propylene, cyclohexanedimethylene, and the like; an oxyalkylene containing, for example, from about 4 to about 30 carbon atoms, such as diethylene glycol or dipropyleneglycol; an arylene radical or group with, for example, from about 6 to about 36 carbon atoms, such as benzylene, 1,4-phenylene, 1,3-phenylene, 1,2-phenylene, or anthracylene; and R' is an alkali arylenesulfonate with, for example, from about 6 to about 30 carbon atoms, such as phenylenesulfonate, isophthalylene-5-sulfonate, terephthalylene-sulfonate phthalylene-sulfonate; an alkali alkylene-sulfonate, such as propylene-sulfonate, butylene-sulfonate, pentylene-sulfonate, hexylene-sulfonate of, for example, the following formulas

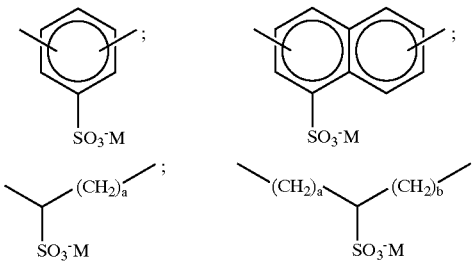

wherein a and b are numbers of from about 1 to about 5, and M is hydrogen, an alkali (I) metal, such as lithium, sodium, potassium, rubidium, cesium, or an alkali (II) metal, such as beryllium, magnesium, calcium, strontium or barium, or a metal, such as zinc (II), iron (III), aluminum (III), or copper (I); and R" is an alkylene, such as ethylene, propylene or butylene.

Moreover, in embodiments the sulfopolyester-siloxane copolymer can be water dissipatible thereby providing a readily available emulsion in water. In embodiments the resins or polymers illustrated herein can be selected for paints, toners, or protective coatings for the protection of substrates from corrosion, oxidative aging, mechanical damage or weathering, such as a coating for textiles, paper, wood, leather, glass, ceramics, porcelain, metal, plastics, stone, concrete, or metal surfaces, and especially wherein water dispersible resin coatings with slip resistance is desired.

REFERENCES

Certain sulfonated polyester resins are known, reference for example U.S. Pat. No. 3,018,272, the disclosure of which is totally incorporated herein by reference, wherein a variety of sulfoacids and metalized sulfonates are incorporated into a polyester resin. In U.S. Pat. No. 3,563,942, the disclosure of which is totally incorporated herein by reference, there are disclosed linear solvent soluble copolyester compositions that can be dispersed in water. Water dispersibility can be achieved, it is believed, by the addition to the copolyester of a small amount (1–2 mole percent) of a metal salt of a sulfonated aromatic compounds. Water dispersible or dissipatible polyester resins are also known, such as those disclosed in U.S. Pat. No. 3,734,874, the disclosure of which is totally incorporated herein by reference, and wherein these sulfonated polyester resins can be derived from a polyethylene glyco and dicarboxylic acid metal salts of 5-sulfoisophthalic acid. U.S. Pat. No. 4,340,519, the disclosure of which is totally incorporated herein by reference, discloses certain crystalline and noncrystalline polyesters copolymerized with a metal sulfonate group containing aromatic acid and up to 10 mole percent (based on the total polyol content) of a polyvalent polyol selected from trimethylolpropane, trimethylolethane, glycerine, and pentaerythritol. Also, U.S. Pat. No. 4,525,524, the disclosure of which is totally incorporated herein by reference, discloses liquid systems comprised of polyester containing certain metal sulfonates and, optionally, up to 3 percent of a branching agent based upon the total diol component.

Other water dispersible polyester based resins comprised of hydrophilic moieties, such as alkali sulfonate groups, are disclosed, for example, in U.S. Pat. Nos. 5,348,832; 5,593,807; 5,604,076; 5,648,193; 5,658,704; 5,660,965; 5,684,063; and 5,698,223, the disclosures of which are each totally incorporated herein by reference. The aforementioned dissipatible polyester resins usually contain hydrophilic moieties in an amount of from about 2 to about 7.5 percent by weight of resin.

Polyester-siloxane copolymers are also known, such as those disclosed in U.S. Pat. No. 4,465,712, the disclosure of which is totally incorporated herein by reference, and wherein a siloxane-polyester composition comprised of the siloxane-polyester copolymer indicated are useful for the coating of substrates, such as metals and plastics. In U.S. Pat. No. 5,932,677, the disclosure of which is totally incorporated herein by reference, there is illustrated a thermoplastic condensation polymer which are terpolymers containing an aromatic polyester, a polysiloxane and a polycarbonate segment.

In U.S. Pat. No. 5,466,554, the disclosure of which is totally incorporated herein by reference, there is disclosed, for example, a toner comprised of a pigment, an optional charge enhancing additive, optional wax, and a polyester resin containing a hydrophobic end group comprised of a siloxane copolymer. In U.S. Pat. No. 5,354,815, the disclosure of which is totally incorporated herein by reference, there are disclosed polymers with enhanced hydrophilicity and thermal regulative properties; exemplary polymers include aliphatic polyamide polymers and polyester polymers. The polymer has bonded thereto a hydrophilic polysiloxane having an affinity for the polymer and with a molecular weight greater than about 1,000 g/mol, more specifically, greater than about 2,000 g/mol, and yet more specifically, greater than about 4,000 g/mol.

Furthermore, in U.S. Pat. No. 5,262,492, the disclosure of which is totally incorporated herein by reference, there is disclosed a siloxane-modified polyester resin. These resins can comprise a copolymer of a siloxane compound, which contains at least one active hydrogen atom, and a lactone compound. The resulting copolymer is substantially free of unreacted siloxane compound.

Processes for the preparation of certain siloxane-modified polyester resins are known, such as those illustrated in U.S. Pat. No. 4,945,147, the disclosure of which is totally incorporated herein by reference, and wherein there can be accomplished the condensation of a tetramethyldisiloxane bisbenzoic acid or an acid chloride with a dihydric phenol, such as bisphenol A, with a mixture of tetramethyldisiloxane bisbenzoic acid and aromatic acids, such as terephthalic acid or isophthalic acid.

There are illustrated in U.S. Pat. No. 5,929,160, the disclosure of which is totally incorporated herein by reference, certain water-dispersible sulfopoly(ester-urethane) compositions comprising, in their backbone, at least one non-terminally disposed arylene or alkylene group comprising a pendant sulfonic acid group or salt thereof, the polymer being terminated by at least one hydrolyzable silyl group such as 3-amino propyltriethoxysilane.

SUMMARY

It is a feature of the present invention to provide novel hydrogen or metalized sulfo-polyester-siloxane resin compositions.

In another feature of the present invention there are provided polyester-siloxane copolymer backbones with an ionic or hydrophilic hydrogen sulfonate group.

In yet another feature of the present invention there are provided polyester-siloxane copolymer backbones containing an ionic metalized sulfonate group, and wherein the metal is, for example, zinc, copper, manganese, chromium, iron, zirconium or an alkali metal, such as sodium, lithium, potassium, rubidium cesium, beryllium, magnesium, calcium, strontium, barium or mixtures thereof.

Moreover, in another feature of the present invention there are provided water emulsions comprised of a hydrogen or metalized sulfo-polyester-siloxane resin and water.

Also, in another feature of the present invention there are provided toner compositions comprised of a hydrogen or metalized sulfo-polyester-siloxane resin, a colorant, and optionally a wax and/or flow additives.

Additionally, further features disclosed include providing toners with low melting fusing characteristics, such as from about 120° C. to about 145° C., broad fusing latitudes, such as from about 30° C. to about 70° C., and excellent charging characteristics; providing metalized sulfo-polyester-siloxane resins with broad, such as about 50° C. to about 65° C. glass transition temperatures, broad molecular weight ranges, and excellent softening points; providing hydrogen and metalized sulfo-polyester-siloxane resin emulsions with from about 10 to about 35 percent solids loading in water for use as coatings; and providing a hydrogen and metalized sulfo-polyester-siloxane resin emulsion for use as a coating on paper, such as for example, to provide paper with a glossy coating and which paper can be useful as a photopaper.

EMBODIMENTS

Disclosed is a sulfonated polyester siloxane polymer generated from the reaction of at least one organic diol monomer, at least one organic diacid monomer or at least one diester monomer, at least one carbinol carboxy terminated polydimethylsiloxane, and at least one ion salt of a sulfonate difunctional monomer; a sulfonated polyestersiloxane polymer, which polymer is represented by the following randomly chemically attached segments

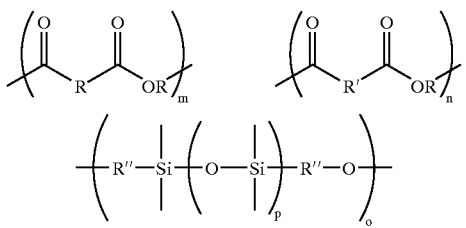

wherein the segments m, n and o represent the random units of the polymer, and wherein the sum of m, n, and o is from about 10 to about 10,000; p represents the repeating segment of the polydimethylsiloxane and is from about 100 to about 10,000 units; R is an alkylene; R' is a hydrogen atom, an alkali arylenesulfonate or an alkali alkylene-sulfonate, and R" is an alkylene; a polymer wherein the alkylene contains from about 1 to about 18 carbon atoms; and the oxyalkylene possesses a carbon chain length of from about 2 to about 36 carbon atoms; a polymer wherein R' is an alkali arylenesulfonate or an alkali alkylene-sulfonate of the formulas

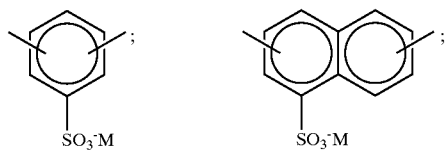

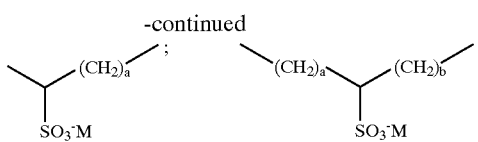

wherein a and b are numbers of from about 1 to about 5, and M is hydrogen, an alkali metal of lithium, sodium, potassium, rubidium, cesium, beryllium, magnesium, calcium, strontium and barium, or a metal of zinc (II), iron (III), aluminum (III), or copper (I); a polymer wherein the ion salt of the sulfonate difunctional monomer is the hydrogen, lithium, sodium, potassium, cesium, rubidium, magnesium, barium, calcium or beryllium, zinc, zirconium, vanadium, copper, or aluminum salt of dimethyl-5-sulfo-isophthalate, dialkyl-5-sulfo-isophthalate-4-sulfo-1,8-naphthalic anhydride, 4-sulfo-phthalic acid, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, dialkyl-sulfo-terephthalate, sulfo-ethanediol, 2-sulfo-propanediol, 2-sulfo-butanediol, 3-sulfo-pentanediol, 2-sulfo-hexanediol, 3-sulfo-2-methylpentanediol, N,N-bis(2-hydroxyethyl)-2-aminoethane sulfonate, 2-sulfo-3,3-dimethylpentanediol, or sulfo-p-hydroxybenzoic acid; a polymer wherein the organic diol is ethylene glycol, 1,2-propylene glycol, 1,3-propylene glycol, 1,2-butylene glycol, 1,3-butylene glycol, 1,4-butylene glycol, 1,2-pentylene glycol, 1,3-pentylene glycol, 1,4-pentylene glycol, 1,5-pentylene glycol, 1,2-hexylene glycol, 1,3-hexylene glycol, 1,4-hexylene glycol, 1,5-hexylene glycol, 1,6-hexylene glycol, heptylene glycols, octylene glycols, decylene glycol, dodecylene glycol, 2,2-dimethyl propanediol, propoxylated bisphenol A, ethoxylated bisphenol A, 1,4-cyclohexane diol, 1,3-cyclohexane diol, 1,2-cyclohexane diol, 1,2-cyclohexane dimethanol, or mixtures thereof, and optionally which glycols are selected in an amount of from about 45 to about 55 mole percent of the polymer product; a polymer wherein the organic diacid or diester is malonic acid, succinic acid, 2-methylsuccinic acid, 2,3-dimethylsuccinic acid, dodecylsuccinic acid, glutaric acid, adipic acid, 2-methyladipic acid, pimelic acid, azelaic acid, sebacic acid, terephthalic acid, isophthalic acid, phthalic acid, 1,2-cyclohexanedioic acid, 1,3-cyclohexanedioic acid, 1,4-cyclohexanedioic acid, glutaric anhydride, succinic anhydride, dodecylsuccinic anhydride, maleic anhydride, fumaric acid, maleic acid, itaconic acid, 2-methyl itaconic acid, dialkyl esters of the diacids and the dianhydrides, and wherein each is selected in an amount of from about 45 to about 55 mole percent of the polymer product; a polymer wherein the carbinol or carboxy terminated polydimethylsiloxane bis-(1,3-hydroxypropyl)-polydimethylsiloxane, bis-(1,3-hydroxyethyl)-polydimethylsiloxane, and bis-(1,3-hydroxybutyl)-polydimethylsiloxane, or carboxyl terminated polydimethyl siloxane, such as bis-(1,3-carboxypropyl)-polydimethylsiloxane, bis-(1,3-carboxyethyl)-polydimethylsiloxane, and selected in an amount of from about 5 mole percent to about 30 mole percent based on the starting diacid or diester used to prepare the polymer; a polymer (siloxane) which possesses a number average molecular weight of from about 2,000 grams per mole to about 100,000 grams per mole, a weight average molecular weight of from about 4,000 grams per mole to about 250,000 grams per mole, and a polydispersity of from about 1.8 to about 17; a polymer which possesses a softening point of from about 20° C. to about 150° C.; a polymer wherein the polymer disperses, dissipates or emulsifies in water at a temperature of from about 20° C. to about 100° C. to thereby provide a waterborne emulsion; a polymer wherein the polymer exists as a waterborne emulsion with a solids content of from about 1 to about 35 percent by weight with the remainder being water; a polymer wherein the polymer exists as a waterborne emulsion and wherein the polymer emulsion size diameter is from about 1 nanometer to about 100 microns in size; a polymer as represented by the following chemically bonded random segments

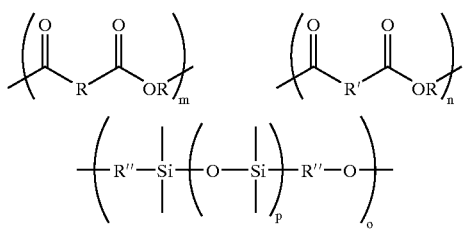

wherein the segments m, n and o represent the random units of the polymer and wherein the sum of m, n, and o is from about 500 to about 4,000; p represents the repeating segment of the polydimethylsiloxane and is from about 1,000 to about 7,000 units; R is an alkylene; R' is an alkali arylene-sulfonate of phenylenesulfonate, isophthalylene-5-sulfonate, terephthalylene-sulfonate, phthalylene-sulfonate, or an alkali alkylene-sulfonate of propylene-sulfonate, butylenes-sulfonate, pentylene-sulfonate, or hexylene-sulfonate of the formulas

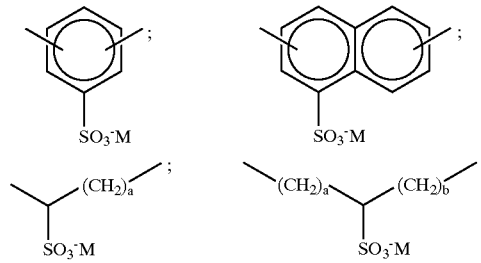

wherein a and b are numbers of from about 1 to about 4, and M is hydrogen, an alkali (I) metal of lithium, sodium, potassium, rubidium, cesium, or an alkali (II) metal of beryllium, magnesium, calcium, strontium or barium or a metal of (II), iron (III), aluminum (III), or copper (I), and R" is ethylene, propylene or butylene derived from at least one organic diol monomer, at least one organic diacid or diester monomer, at least one carbinol or carboxy terminated polydimethylsiloxane, and at least an ion salt of the sulfonate difunctional monomer; a polymer wherein the polyester siloxane is selected from the group consisting of copoly(dipropylene terephthalate-co-diethylene terephthalate)-copoly(dipropylene 5-sulfoisophthalate-co-diethylene 5-sulfo-isophthalate)-copolydimethylsiloxane, copoly(1,2-propylene terephthalate-)-copoly(1,2-propylene 5-sulfoisophthalate)-copolydimethylsiloxane, copoly(dipropylene terephthalate)-copoly(dipropylene 5-sulfoisophthalate)-copolydimethyl siloxane, copoly(ethylene terephthalate)-copoly(ethylene 5-sulfoisophthalate)-copolydimethylsiloxane, copoly(butyllene terephthalate)-copoly(butyllene 5-sulfoisophthalate)-copolydimethylsiloxane, and copoly(1,3-propylene terephthalate)-copoly(1,3-propylene 5-sulfoisophthalate)-copolydimethylsiloxane; a polymer wherein the polyester siloxane is copoly(1,2-propylene terephthalate-co-diethylene terephthalate)-copoly(1,2-propylene 5-sulfoisophthalate-co-diethylene 5-sulfo-isophthalate)-copolydimethylsiloxane; a polymer wherein the organic diacid or diester is terephthalic acid or dimethyl terephthalate; a sulfonated polyester siloxane copolymer resin generated from the reaction of at least one organic diol monomer, at least one organic diacid monomer, at least one carbinol carboxy terminated polydimethyl siloxane, and at least one ion salt of a sulfonate difunctional monomer; a sulfonated polyester siloxane copolymer resin generated from the reaction of at least one organic diol monomer, at least one organic diester monomer, at least one carbinol carboxy terminated polydimethyl siloxane, and at least one ion salt of a sulfonate difunctional monomer, and optionally wherein at least one is from about 1 to about 7; a polymer wherein the alkylene is ethylene, propylene, butylenes, pentylene, hexylene, heptylene, or octylene; a polymer wherein at least one is from 1 to about 25; a polymer wherein at least one is from 1 to about 10; a polymer wherein at least one is from 1 to about 5, and there is selected an organic diacid monomer; a polymer wherein at least one is 1; a polymer wherein there is selected an organic diester monomer; a toner comprised of colorant and a sulfonated polyester-siloxane polymer generated from the reaction of at least one organic diol monomer, at least one organic diacid or at least one diester monomer, at least one carbinol carboxy terminated polydimethyl siloxane, and at least one ion salt of a sulfonate difunctional monomer; a toner wherein the colorant is a pigment; a toner wherein the colorant is a dye; a toner wherein the colorant is comprised of a mixture of a pigment and a dye; a toner wherein the polymer contained therein is copoly(1,2-propylene terephthalate-co-diethylene terephthalate)-copoly(1,2-propylene 5-sulfoisophthalate-co-diethylene 5-sulfo-isophthalate)-copolydimethylsiloxane, copoly(dipropylene terephthalate-co-diethylene terephthalate)-copoly(dipropylene 5-sulfoisophthalate-co-diethylene 5-sulfo-isophthalate)-copolydimethylsiloxane, copoly(1,2-propylene terephthalate)-copoly(1,2-propylene 5-sulfoisophthalate)-copolydimethylsiloxane, or copoly(dipropylene terephthalate)-copoly(dipropylene 5-sulfoisophthalate)-copolydimethylsiloxane; a toner comprised of a polymer represented by the following randomly chemically attached segments

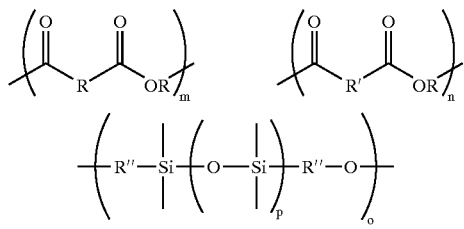

wherein the segments m, n and o represent the random units of the polymer and wherein the sum of m, n, and o is from about 10 to about 10,000; p represents the repeating segment of the polydimethyl siloxane, and is from about 100 to about 10,000 units; R is an alkylene; R' is a hydrogen atom, an alkali arylenesulfonate or an alkali alkylene-sulfonate, and R" is an alkylene; a toner wherein the alkylene contains from about 1 to about 18 carbon atoms; and the oxyalkylene possesses a carbon chain length of from about 2 to about 36 carbon atoms; a toner wherein R' is an alkali arylene sulfonate or an alkali alkylene sulfonate of the formulas

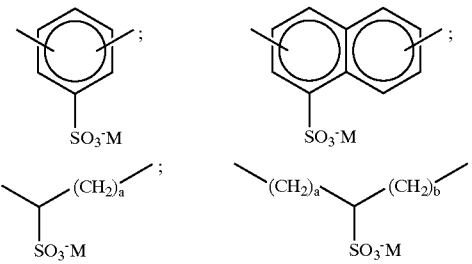

wherein a and b are numbers of from about 1 to about 5, and M is hydrogen, an alkali metal of lithium, sodium, potassium, rubidium, cesium, beryllium, magnesium, calcium, strontium and barium, or a metal of zinc (II), iron (III), aluminum (III), or copper (I); a toner wherein the ion salt of the sulfonate difunctional monomer is the hydrogen, lithium, sodium, potassium, cesium, rubidium, magnesium, barium, calcium or beryllium, zinc, zirconium, vanadium, copper, or aluminum salt of dimethyl-5-sulfo-isophthalate, dialkyl-5-sulfo-isophthalate-4-sulfo-1,8-naphthalic anhydride, 4-sulfo-phthalic acid, 4-sulfo-phenyl-3,5-dicarbomethoxybenzene, 6-sulfo-2-naphthyl-3,5-dicarbomethoxybenzene, sulfo-terephthalic acid, dimethyl-sulfo-terephthalate, dialkyl-sulfo-terephthalate, sulfo-ethanediol, 2-sulfo-propanediol, 2-sulfo-butanediol, 3-sulfopentanediol, 2-sulfo-hexanediol, 3-sulfo-2-methylpentanediol, N,N-bis(2-hydroxyethyl)-2-aminoethane sulfonate, or 2-sulfo-3,3-dimethylpentanediol, sulfo-p-hydroxybenzoic acid; a toner as represented by the following chemically bonded random segments

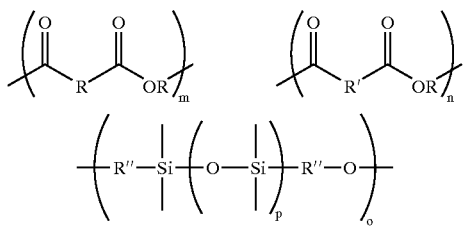

wherein the segments m, n and o represent the random units of the polymer and wherein the sum of m, n, and o is from about 500 to about 4,000; p represents the repeating segment of the polydimethylsiloxane and is from about 1,000 to about 7,000 units; R is an alkylene; R' is an alkali arylene-sulfonate of phenylenesulfonate, isophthalylene-5-sulfonate, terephthalylene-sulfonate phthalylene-sulfonate, or an alkali alkylene-sulfonate of propylene-sulfonate, butylene-sulfonate, pentylene-sulfonate, hexylene-sulfonate of the formulas

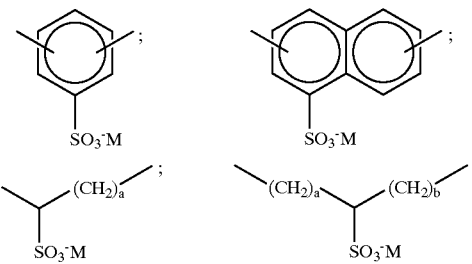

wherein a and b are numbers of from about 1 to about 4, and M is hydrogen, an alkali (I) metal of lithium, sodium, potassium, rubidium, cesium, an alkali (II) metal of beryllium, magnesium, calcium, strontium or barium, a metal of (II), iron (III), aluminum (III), or copper (I), and R″ is ethylene, propylene or butylene; a toner wherein the polyester siloxane is selected from the group consisting of copoly(1,2-propylene terephthalate-co-diethylene terephthalate)-copoly(1,2-propylene 5-sulfoisophthalate-co-diethylene 5-sulfo-isophthalate)-copolydimethyl siloxane, copoly(dipropylene terephthalate-co-diethylene terephthalate)-copoly(dipropylene 5-sulfoisophthalate-co-diethylene 5-sulfo-isophthalate)-copolydimethyl siloxane, copoly(1,2-propylene terephthalate)-copoly(1,2-propylene 5-sulfoisophthalate)-copolydimethylsiloxane, and copoly (dipropylene terephthalate)-copoly(dipropylene 5-sulfoisophthalate)-copolydimethyl siloxane or mixtures thereof; a toner comprised of a colorant and a sulfonated polyester siloxane copolymer resin generated from the reaction of an organic diol monomer, an organic diacid monomer, a carbinol carboxy terminated polydimethylsiloxane, and at least one ion salt of a sulfonate difunctional monomer; a toner comprised of a colorant and sulfonated polyester siloxane copolymer resin generated from the reaction of an organic diol monomer, an organic diester monomer, a carbinol carboxy terminated polydimethylsiloxane, and a salt of a sulfonate difunctional monomer; a developer comprised of the toner illustrated herein and carder; a developer wherein the carrier is comprised of a core and a coating thereover; a developer wherein the carrier is comprised of a ferrite; a developer wherein the carrier is comprised of a core with at least one polymer coating thereover; a toner wherein there is selected an organic diacid monomer; a toner wherein there is selected a diester monomer; a toner wherein the polyester siloxane is copoly(1,2-propylene terephthalate-co-diethylene terephthalate)-copoly(1,2-propylene 5-sulfoisophthalate-co-diethylene 5-sulfo-isophthalate)-copolydimethyl siloxane; polyester-siloxane copolymer backbones with an ionic or a hydrophilic hydrogen sulfonate and metalized sulfonate groups, and wherein the metal is, for example, zinc, copper, manganese, chromium, iron, zirconium or an alkali metal, such as sodium, lithium, potassium, rubidium cesium, beryllium, magnesium, calcium, strontium, barium or mixtures thereof.

Examples of the polyester-siloxane include copoly(1,2-propylene terephthalate-co-diethylene terephthalate)-copoly (1,2-propylene 5-sulfoisophthalate-co-diethylene 5-sulfo-isophthalate)-copolydimethyl siloxane, copoly(dipropylene terephthalate-co-diethylene terephthalate)-copoly (dipropylene 5-sulfoisophthalate-co-diethylene 5-sulfo-isophthalate)-copolydimethylsiloxane, copoly(1,2-propylene terephthalate)-copoly(1,2-propylene 5-sulfoisophthalate)-copolydimethylsiloxane, copoly (dipropylene terephthalate)-copoly(dipropylene 5-sulfoisophthalate)-copolydimethyl siloxane, copoly (ethylene terephthalate)-copoly(ethylene 5-sulfoisophthalate)-copolydimethylsiloxane, copoly (butyllene terephthalate)-copoly(butyllene 5-sulfoisophthalate)-copolydimethylsiloxane, and copoly(1, 3-propylene terephthalate)-copoly(1,3-propylene 5-sulfoisophthalate)-copolydimethylsiloxane, and the like; and wherein the polyester-siloxanes can be characterized by gel permeation chromatography and with, for example, a weight average molecular weight of from about 5,000 to about 500,000 and preferably from about 5,000 to about 100,000 grams per mole; a number average molecular weight of from about 2,000 to about 100,000, and more specifically, from about 2,500 to about 50,000 grams per mole; and a polydispersity of from about 2 to 30, and more specifically, from about 2 to about 15.

The sulfo-polyester-siloxane resins can be prepared from a suitable selection of monomers, which result in the polyester portion of the sulfo-polyester-siloxane resin that displays, for example, a glass transition temperature of from about 10° C. to about 100° C., and wherein the polydimethylsiloxane portion of the copolymer displays a glass transition temperature of from about −78° C. to about −20° C. with respect to the sulfo-polyester-siloxane resins; and wherein with sulfo-polyester-siloxane resin with the appropriate selection of monomers can display a molecular weight, $M_w$ of from about 5,000 grams per mole to about 500,000 grams per mole, a number average molecular weight of from about 2,500 grams per mole to about 300,000 grams per mole, and a polydispersity of from about 2 to about 100 as measured by gel permeation chromatography, and preferably a molecular weight, $M_w$ of from about 5,000 grams per mole to about 100,000 grams per mole, a number average molecular weight of from about 2,500 grams per mole to about 50,000 grams per mole, and a polydispersity of from about 2 to about 10.

In embodiments the sulfopolyestersiloxane resin, such as copoly(1,2-propylene-5-sulfoisophthalate sodio salt)-copoly (1,2-propylene terephthalate-co-diethylene terephthalate)-copoly-dimethylsiloxane, can be prepared by charging a 1 liter Parr reactor equipped with a mechanical stirrer and side condenser with a mixture of from about 0.10 mole to about 0.2, and more specifically, 0.10 mole to about 0.15 mole of a carbinol terminated polydimethylsiloxane PS554, available from United Chemical Technologies; from about 0.8 to about 0.95 mole, and more specifically, from about 0.9 to about 0.95 mole of diester, such as dimethylterephthalate; from about 0.05 to about 0.05 mole, and more specifically, 0.025 to about 0.05 mole of sulfonate monomer, such as dimethyl 5-sulfo-isophthalate sodio salt; from about 1.5 moles to about 1.95 moles, and more specifically, from about 1.75 moles to about 1.85 moles of a diol, such as 1,2-propanediol or diethylene glycol or a mixture of the diols, and containing from about 0.15 to about 0.3 mole, and more specifically, from about 0.15 to about 0.3 mole of diethylene glycol, and from about 0.01 to about 0.001 mole, and more specifically, from about 0.02 to about 0.05 mole of a condensation catalyst, such as butyltin oxide hydroxide. The reactor is subsequently heated, for example, to 170° C. for a suitable duration of, for example, from about 360 minutes to about 720 minutes with stirring at, for example, from about 10 revolutions per minute to about 200 revolutions per minute. During this time, from about 1.7 moles to about 1.9 moles of methanol byproduct can be collected through the condenser. The reactor temperature is then increased to about 220° C. and the pressure is reduced from 760 Torr to about 1 Torr over a period of from about 2 hours to about 3 hours. The polymeric resin product comprised of copoly(1, 2-propylene-5-sulfoisophthalate sodio salt)-poly(1,2-propylene terephthalate-co-diethylene terephthalate)-copolydimethylsiloxane, can then be discharged through the bottom of the reactor and cooled to room temperature, about 22° C. to about 25° C. The product is then identified by physical analysis, such as differential scanning calorimetry, gel permeation chromatography, and rheology.

Specific examples of diols selected for the preparation of the sulfo polyester-siloxanes include various known diols, such as ethylene glycol, 1,2-propylene glycol, 1,3-propylene glycol, 1,2-butylene glycol, 1,3-butylene glycol, 1,4-butylene glycol, 1,2-pentylene glycol, 1,3-pentylene glycol, 1,4-pentylene glycol, 1,5-pentylene glycol, 1,2-hexylene glycol, 1,3-hexylene glycol, 1,4-hexylene glycol, 1,5-hexylene glycol, 1,6-hexylene glycol, heptylene glycols, octylene glycols, decylene glycol, dodecylene glycol, 2,2-dimethyl propanediol, propoxylated bisphenol A, ethoxylated bisphenol A, 1,4-cyclohexane diol, 1,3-cyclohexane diol, 1,2-cyclohexane diol, 1,2-cyclohexane dimethanol, mixtures thereof, and the like; and wherein the diol can be selected, for example, in various effective amounts of, for example, from about 45 to about 55 mole, and more specifically, from about 49 to about 51 percent of the polyester product resin.

Examples of diacids or diesters selected for the preparation of the sulfo polyester-siloxanes include malonic acid, succinic acid, 2-methylsuccinic acid, 2,3-dimethylsuccinic acid, dodecylsuccinic acid, glutaric acid, adipic acid, 2-methyladipic acid, pimelic acid, azelaic acid, sebacic acid, terephthalic acid, isophthalic acid, phthalic acid, 1,2-cyclohexanedioic acid, 1,3-cyclohexanedioic acid, 1,4-cyclohexanedioic acid, glutaric anhydride, succinic anhydride, dodecylsuccinic anhydride, maleic anhydride, fumaric acid, maleic acid, itaconic acid, 2-methyl itaconic acid, and dialkyl esters, such as the methyl, ethyl, propyl, butyl, pentyl, hexyl, heptyl, or octyl esters of above mentioned acids. The alkyl groups of the dialkyl ester possess from about one carbon atom to about 5 carbon atoms, and mixtures thereof, and the like, and which component is employed, for example, in amounts of from about 45 to about 55, and more specifically, from about 48 to about 51 mole percent of the resin.

Examples of polycondensation catalysts selected include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof; and which catalysts are selected in effective amounts of from, for example, about 0.5 to 2 mole percent, 0.01 mole percent to about 5 mole percent based on the starting diacid or diester used to generate the polyester resin.

Hydrophilic monomer examples, which can be selected for the preparation of the sulfo polyester-siloxane resin, include the ion salts of sulfonated difunctional monomers wherein the ion is an alkali or alkaline earth, such as lithium, sodium, potassium, cesium, rubidium, magnesium, barium, calcium or beryllium and the like, and the sulfonated difunctional moiety is selected from the group consisting of dimethyl-5-sulfo-isophthalate, dialkyl-5-sulfo-isophthalate-4-sulfo-1,8-naphthalic anhydride, 4-sulfo-phthalic acid, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, dialkyl-sulfo-terephthalate, sulfo-ethanediol, 2-sulfo-propanediol, 2-sulfo-butanediol, 3-sulfopentanediol, 2-sulfo-hexanediol, 3-sulfo-2-methylpentanediol, N,N-bis(2-hydroxyethyl)-2-aminoethane sulfonate, 2-sulfo-3,3-dimethylpentanediol, sulfo-p-hydroxybenzoic acid, mixtures thereof and the like. Effective hydrophilic amounts of, for example, from about 0.1 to about 5 weight percent, and more specifically, from about 2 to about 4 weight percent of the resin can be selected.

Additionally, crosslinking or branching agents can be utilized in the process of preparation, such as trifunctional or multifunctional monomers, which agents usually increase the molecular weight and polydispersity of the polyester, and which agents are selected from the group consisting of glycerol, trimethylol ethane, trimethylol propane, pentaerythritol, sorbitol, diglycerol, trimellitic acid, trimellitic anhydride, pyromellitic acid, pyromellitic anhydride, 1,2,4-cyclohexanetricarboxylic acid, 2,5,7-naphthalenetricarboxylic acid, 1,2,4-butanetricarboxylic acid, mixtures thereof, and the like; and which agents or components can be selected in effective amounts of from, for example, about 0.1 to about 6 mole percent, and more specifically, about 0.5 to about 4 mole percent based on the starting diacid or diester used to generate the resin.

Polydimethylsiloxane prepolymers that can be selected for the preparation of the sulfo polyester-siloxane resins include carbinol terminated polydimethylsiloxane, such as bis-(1,3-hydroxypropyl)-polydimethylsiloxane, bis-(1,3-hydroxyethyl)-polydimethylsiloxane, and bis-(1,3-hydroxybutyl)-polydimethylsiloxane, or carboxyl terminated polydimethylsiloxane, such as bis-(1,3-carboxypropyl)-polydimethylsiloxane, bis-(1,3-carboxyethyl)-polydimethylsiloxane, and which prepolymer can be selected in effective amounts of, for example, from about 5 to about 30 mole percent, and more specifically, from about 10 to about 25 mole percent based on the starting diacid or diester used to generate the resins.

The resins illustrated herein can be selected as toners and coatings; examples of toners include the resin, colorant, and know additives.

The following Examples are being supplied to further define various species of the present invention, it being noted that these Examples are intended to illustrate and not limit the scope of the present invention. Parts and percentages are by weight, temperatures are in degrees Centigrade, and g represents grams unless otherwise indicated.

EXAMPLE I

There was prepared copoly(1,2-propylene terephthalate-co-diethylene terephthalate)-copoly(1,2-propylene 5-sulfo-isophthalate-co-diethylene 5-sulfo-isophthalate)-copolydimethylsiloxane derived from propylene glycol, diethylene glycol, dimethyl terephthalate, sodio dimethyl 5-sulfoisophthalate, and 15 weight percent of carbinol terminated polydimethylsiloxane.

A 1 liter Parr reactor equipped with a bottom drain valve, a double turbine agitator and a distillation receiver with a cold water condenser was charged with 313 grams of dimethylterephthalate, 38 grams of dimethyl 5-sulfo isophthalate sodium salt, 250 grams of 1,2-propanediol, 37.5 grams of diethylene glycol, 67 grams of bis-(1,3-hydroxypropyl)polydimethylsiloxane available as a carbinol terminated polydimethylsiloxane 563 with viscosity of about 300 to about 350 centistokes and available from United Chemical Technologies, and 1 gram of butyltin oxide catalyst obtained as FASCAT 4100™ from Elf Atochem North America, Inc. The reactor was then heated to 165° C. (degrees Centigrade) with stirring at 150 revolutions per minute and then heated to 200° C. over a duration of 6 hours wherein a methanol byproduct was collected, via the distillation receiver, in a container, and which byproduct was comprised of about 98 percent by volume of methanol and 2 percent by volume of 1,2-propanediol as measured by the ABBE refractometer available from American Optical Corporation. The reactor mixture was then maintained at 200° C., and the pressure was reduced from atmospheric to about 0.2 Torr over a duration of about 3 hours. During this time of 3 hours, there were collected 120 grams of glycol containing about 97 percent by volume of 1,2-propanediol and 3 percent by volume of methanol as measured by the ABBE refractometer. The reactor was then purged with nitrogen to atmospheric pressure, and the polymer was discharged through the bottom drain onto a container cooled with dry ice to yield 485 grams of copoly(1,2-propylene terephthalate-co-diethylene terephthalate)-copoly(1,2-propylene 5-sulfoisophthalate-co-diethylene 5-sulfo-isophthalate)-copolydimethyl siloxane.

The above resulting resin product glass transition temperature was measured to be 53° C. (onset) utilizing the 910 Differential Scanning Calorimeter available from E. I. DuPont operating at a heating rate of 10° C. per minute. For the polyester resin of this Example, a softening point of 131.2° C. was obtained using a Mettler Flow tester.

EXAMPLE II

There was prepared copoly(1,2-propylene terephthalate-co-diethylene terephthalate)-copoly(1,2-propylene 5-sulfo-isophthalate-co-diethylene 5-sulfo-isophthalate)-copolydimethylsiloxane derived from propylene glycol, diethylene glycol, dimethyl terephthalate, sodio dimethyl 5-sulfoisophthalate, and 15 weight percent of a carbinol terminated polydimethylsiloxane.

A 1 liter Parr reactor equipped with a bottom drain valve, double turbine agitator and distillation receiver with a cold water condenser was charged with 313 grams of dimethylterephthalate, 38 grams of dimethyl 5-sulfo isophthalate sodium salt, 250 grams of 1,2-propanediol, 37.5 grams of diethylene glycol, 67 grams of bis-(1,3-hydroxypropyl)polydimethylsiloxane available as Carbinol terminated polydimethylsiloxane 563 with viscosity of about 300 to about 350 centistokes and available from United Chemical Technologies, and 1 gram of butyltin oxide catalyst obtained as FASCAT 4100™ from Elf Atochem North America, Inc. The reactor was then heated to 165° C. with stirring at 150 revolutions per minute and then heated to 200° C. over a duration of 6 hours, wherein a methanol byproduct was collected in a container via the distillation receiver, and which byproduct was comprised of about 98 percent by volume of methanol and 2 percent by volume of 1,2-propanediol as measured by a ABBE refractometer available from American Optical Corporation. The reactor mixture was then maintained at 200° C., and the pressure was reduced from atmospheric to about 0.2 Torr over a duration of about 3 hours. During this time of 3 hours, there were collected 120 grams of glycol containing about 97 percent by volume of 1,2-propanediol and 3 percent by volume of methanol as measured by the ABBE refractometer. The reactor was then purged with nitrogen to atmospheric pressure, and the polymer discharged through the bottom drain onto a container cooled with dry ice to yield 485 grams of copoly(1,2-propylene terephthalate-co-diethylene terephthalate)-copoly(1,2-propylene 5-sulfoisophthalate-co-diethylene 5-sulfo-isophthalate)-copolydimethyl siloxane.

The above resulting resin product glass transition temperature was measured to be 61.8° C. (onset) utilizing the 910 Differential Scanning Calorimeter available from E. I. DuPont operating at a heating rate of 10° C. per minute. For the polyester resin of this Example, a softening point of 150.9° C. was obtained as measured with a known Mettler Flow tester.

EXAMPLE III

There was prepared poly(1,2-propylene terephthalate-co-diethylene terephthalate)-copoly(1,2-propylene 5-sulfo-isophthalate-co-diethylene 5-sulfo-isophthalate)-copolydimethylsiloxane derived from propylene glycol, diethylene glycol, dimethyl terephthalate, sodio dimethyl 5-sulfoisophthalate, and 10 weight percent of Carbinol terminated polydimethylsiloxane.

A 1 liter Parr reactor equipped with a bottom drain valve, double turbine agitator and distillation receiver with a cold water condenser was charged with 313 grams of dimethylterephthalate, 38 grams of dimethyl 5-sulfo isophthalate sodium salt, 250 grams of 1,2-propanediol, 37.5 grams of diethylene glycol, 45.8 grams of bis-(1,3-hydroxypropyl)polydimethylsiloxane available as carbinol terminated pblydimethylsiloxane 563 with viscosity of about 300 to about 350 centistokes and available from United Chemical Technologies, and 1 gram of butyltin oxide catalyst obtained as FASCAT 4100™ from Elf Atochem North America, Inc. The reactor was then heated to 165° C. with stirring at 150 revolutions per minute and then heated to 200° C. over a duration of 6 hours, wherein a methanol byproduct was collected via the distillation receiver to a container, and which byproduct was comprised of about 98 percent by volume of methanol and 2 percent by volume of 1,2-propanediol as measured by the ABBE refractometer available from American Optical Corporation. The reactor mixture was then maintained at 200° C., and the pressure was reduced from atmospheric to about 0.2 Torr over a duration of about 3 hours. During this time of 3 hours, there were collected 120 grams of glycol containing about 97 percent by volume of 1,2-propanediol and 3 percent by volume of methanol as measured by the ABBE refractometer. The reactor was then purged with nitrogen to atmospheric pressure, and the polymer discharged through the bottom drain onto a container cooled with dry ice to yield 485 grams of copoly(1,2-propylene terephthalate-co-diethylene terephthalate)-copoly(1,2-propylene 5-sulfoisophthalate-co-diethylene 5-sulfo-isophthalate)-copolydimethyl siloxane.

The above resulting resin product glass transition temperature was measured to be 55.2° C. (onset) utilizing the 910 Differential Scanning Calorimeter available from E. I. DuPont operating at a heating rate of 10° C. per minute. For the polyester resin of this Example, a softening point of 136.8° C. was measured using the Mettler Flow tester.

EXAMPLE IV

There was prepared copoly(1,2-propylene terephthalate-co-diethylene terephthalate)-copoly(1,2-propylene 5-sulfo-isophthalate-co-diethylene 5-sulfo-isophthalate)-copolydimethylsiloxane derived from propylene glycol, diethylene glycol, dimethyl terephthalate, sodio dimethyl 5-sulfoisophthalate, and 10 weight percent of Carbinol terminated polydimethylsiloxane.

A 1 liter Parr reactor equipped with a bottom drain valve, double turbine agitator and distillation receiver with a cold water condenser was charged with 313 grams of dimethylterephthalate, 38 grams of dimethyl 5-sulfo isophthalate sodium salt, 250 grams of 1,2-propanediol, 37.5 grams of diethylene glycol, 45 grams of bis-(1,3-hydroxypropyl)polydimethylsiloxane available as Carbinol terminated polydimethylsiloxane 563 with viscosity of about 300 to about 350 centistokes and available from United Chemical Technologies, and 1 gram of butyltin oxide catalyst obtained as FASCAT 4100™ from Elf Atochem North America, Inc. The reactor was then heated to 165° C. with stirring at 150 revolutions per minute and then heated to 200° C. over a duration of 6 hours, wherein a methanol byproduct was collected to a container via the distillation receiver, and which byproduct was comprised of about 98 percent by volume of methanol and 2 percent by volume of 1,2-propanediol as measured by the ABBE refractometer available from American Optical Corporation. The reactor mixture was then maintained at 200° C., and the pressure was reduced from atmospheric to about 0.2 Torr over a duration of about 3 hours. During this time of 3 hours, there were collected 120 grams of glycol containing about 97 percent by volume of 1,2-propanediol and 3 percent by volume of methanol as measured by the ABBE refractometer. The reactor was then purged with nitrogen to atmospheric pressure, and the polymer discharged through the bottom drain onto a container cooled with dry ice to yield 485 grams of copoly(1,2-propylene terephthalate-co-diethylene terephthalate)-copoly(1,2-propylene 5-sulfoisophthalate-co-diethylene 5-sulfo-isophthalate)-copolydimethyl siloxane.

The above resulting resin product glass transition temperature was measured to be 63.6° C. (onset) utilizing the 910 Differential Scanning Calorimeter available from E. I. DuPont operating at a heating rate of 10° C. per minute. For the polyester resin of this Example a softening point of 154.1° C. was measured using the Mettler Flow tester.

EXAMPLE V

There was prepared copoly(1,2-propylene terephthalate-co-diethylene terephthalate)-copoly(1,2-propylene 5-sulfo-isophthalate-co-diethylene 5-sulfo-isophthalate)-copolydimethylsiloxane derived from propylene glycol, diethylene glycol, dimethyl terephthalate, sodio dimethyl 5-sulfoisophthalate, and 5 weight percent of a Carbinol terminated polydimethylsiloxane.

A 1 liter Parr reactor equipped with a bottom drain valve, double turbine agitator and distillation receiver with a cold water condenser was charged with 313 grams of dimethylterephthalate, 38 grams of dimethyl 5-sulfo isophthalate sodium salt, 250 grams of 1,2-propanediol, 37.5 grams of diethylene glycol, 23 grams of bis-(1,3-hydroxypropyl)polydimethylsiloxane available as Carbinol terminated polydimethylsiloxane 563 with viscosity of about 300 to about 350 centistokes and available from United Chemical Technologies, and 1 gram of butyltin oxide catalyst obtained as FASCAT 4100™ from Elf Atochem North America, Inc. The reactor was then heated to 165° C. with stirring at 150 revolutions per minute and then heated to 200° C. over a duration of 6 hours, wherein a methanol byproduct was collected via the distillation receiver to a container, and which byproduct was comprised of about 98 percent by volume of methanol and 2 percent by volume of 1,2-propanediol as measured by the ABBE refractometer available from American Optical Corporation. The reactor mixture was then maintained at 200° C., and the pressure was reduced from atmospheric to about 0.2 Torr over a duration of about 3 hours. During this time of 3 hours, there were collected 120 grams of glycol containing about 97 percent by volume of 1,2-propanediol and 3 percent by volume of methanol as measured by the ABBE refractometer. The reactor was then purged with nitrogen to atmospheric pressure, and the polymer discharged through the bottom drain onto a container cooled with dry ice to yield 485 grams of copoly(1,2-propylene terephthalate-co-diethylene terephthalate)-copoly(1,2-propylene 5-sulfoisophthalate-co-diethylene 5-sulfo-isophthalate)-copolydimethyl siloxane.

The above resulting resin product glass transition temperature was measured to be 64.7° C. (onset) utilizing the 910 Differential Scanning Calorimeter available from E. I. DuPont operating at a heating rate of 10° C. per minute. For the polyester resin of this Example, a softening point of 143° C. was obtained using the Mettler Flow tester.

EXAMPLE VI

There was prepared copoly(1,2-propylene terephthalate-co-diethylene terephthalate)-copoly(1,2-propylene 5-sulfo-isophthalate-co-diethylene 5-sulfo-isophthalate)-copolydimethylsiloxane derived from propylene glycol, diethylene glycol, dimethyl terephthalate, sodio dimethyl 5-sulfoisophthalate, and 5 weight percent of Carbinol terminated polydimethylsiloxane.

A 1 liter Parr reactor equipped with a bottom drain valve, double turbine agitator and distillation receiver with a cold water condenser was charged with 313 grams of dimethylterephthalate, 38 grams of dimethyl 5-sulfo isophthalate sodium salt, 250 grams of 1,2-propanediol, 37.5 grams of diethylene glycol, 23 bis-(1,3-hydroxypropyl) polydimethylsiloxane available as Carbinol terminated polydimethylsiloxane 563 with viscosity of about 300 to about 350 centistoke and available from United Chemical Technologies, and 1 gram of butyltin oxide catalyst obtained as FASCAT 4100™ from Elf Atochem North America, Inc. The reactor was then heated to 165° C. with stirring at 150 revolutions per minute and then heated to 200° C. over a duration of 6 hours, wherein a methanol byproduct was collected to a container via the distillation receiver, and which byproduct was comprised of about 98 percent by volume of methanol and 2 percent by volume of 1,2-propanediol as measured by the ABBE refractometer available from American Optical Corporation. The reactor mixture was then maintained at 200° C., and the pressure was reduced from atmospheric to about 0.2 Torr over a duration of about 3 hours. During this time of 3 hours, there were collected 120 grams of glycol containing about 97 percent by volume of 1,2-propanediol and 3 percent by volume of methanol as measured by the ABBE refractometer. The reactor was then purged with nitrogen to atmospheric pressure, and the polymer discharged through the bottom drain onto a container cooled with dry ice to yield 485 grams of copoly(1,2-propylene terephthalate-co-diethylene terephthalate)-copoly(1,2-propylene 5-sulfoisophthalate-co-diethylene 5-sulfo-isophthalate)-copolydimethyl siloxane.

The above resulting resin/polymer product glass transition temperature was measured to be 63.7° C. (onset) utilizing the 910 Differential Scanning Calorimeter available from E. I. DuPont operating at a heating rate of 10° C. per minute. For the polyester resin of this Example a softening point of 140° C. was measured with the Mettler Flow tester.

EXAMPLES VII TO XII

Each of the above prepared sulfo polyester-siloxane resins were dispersed in water at about 85° C. to about 95° C. with agitation to provide a stable emulsion, that is, for example, the emulsion siloxane polymer diameter size did not substantially change in composition or properties on storing over extended time periods, such as two weeks. The solids loading of the emulsions were about 76 percent by weight of resin and about 24 percent by weight of water. The particle size of the resin in the emulsion latex was then measured utilizing the Nincomp Particle size analyzer. Typically, a bimodal or trimodal distribution of particle sizes were obtained, and the peaks thereof are recited in Table A. The values in the table refer to the measured resin emulsion size diameters.

TABLE A

| EX. | RESIN | EMULSION SIZES | | |
|---|---|---|---|---|
| VII | Example I | 32% at 11.0 nm | 66% at 34.9 nm | 2% at 154.6 nm |
| VIII | Example | 83.6% at 48 nm | 14.3% at 111 nm | 2% at 193.6 nm |

TABLE A-continued

| EX. | RESIN | EMULSION SIZES | |
|---|---|---|---|
| IX | Example II | 99.8% at 32 nm | 0.2% 160.7 nm |
| X | Example III | 99.7% 32.0 nm | 0.3% at 164.7 |
| XI | Example IV | 100.00% at 43.8 nm | |
| XII | Example V | 51.5% at 23.6 nm | 48.5% at 47.0 nm |
| | Example VI | | |

Toner Preparation

Although toners can be prepared by the conventional extrusion and jetting process, since these resins are emulsifiable in water, an emulsion coalescence route was selected.

EXAMPLES XIII TO XVIII

Six toners comprised of 4 percent (percent by weight) of a cyan pigment, available from Sun Chemicals as FLEXIVERSE PB 15:3™, and 96 percent by weight of the sulfopolyester-siloxanes of Examples I to VI were prepared by the following procedure; tabulated in Table B are the toners measured respective particle size, GSD and glass transition temperature.

To a 4 liter glass kettle equipped with a mechanical stirrer and heating mantle were added 2.4 liters of a 10 percent by weight of the sulfopolyester-siloxane emulsion of Examples I to VI (Table B), and 22.85 grams of cyan pigment, available as a 42 percent pigment dispersion in water and obtained from Sun Chemicals as FLEXIVERSE PB 15:3™. The resulting mixture was then heated to 56° C. and stirred at 250 revolutions per minute. To this was then added using a pump and over a 5 hour period 1 liter of an aqueous solution comprised of 5 percent by weight of zinc acetate. The mixture resulting was then heated at 56° C. for an additional 2 hours, and then left to cool to room temperature, about 22° C. to 25° C., overnight, about 18 to about 20 hours. The toner product was then filtered off, and washed two times by re-suspending it in 4 liters of water; stirred for 2 hours and refiltered. The filtered toner products were then dried using a fluid bed drier. Each of the dry toners were then characterized by a differential scanning calorimeter.

TABLE B

| | CYAN TONERS | | | |
|---|---|---|---|---|
| TONER | RESIN | P.S. | GSD | Tg (onset) |
| Example XIII | Example I | 6.09 | 1.25 | 63.6 |
| Example XIV | Example II | 7.21 | 1.25 | 55.8 |
| Example XV | Example III | 5.94 | 1.22 | 59.5 |
| Example XVI | Example IV | 6.66 | 1.21 | 62.4 |
| Example XVII | Example V | 5.69 | 1.23 | 65.6 |
| Example XVIII | Example VI | 6.21 | 1.21 | 65.9 |

Unfused images were generated with the above toners on Xerox Colour Expression (CX) paper. Excellent images were achieved with a developer comprised of the above toners and a Xerox carrier 9700MICR comprised of, for example, a core of iron or steel, and thereover a coating of a polymethyl methacrylate, 40 weight percent, and polyvinylidene fluoride, 60 weight percent, and wherein the toners had added thereto 4 percent silica, available as AEROSIL™ from Degussa Chemicals, 2.3 percent by weight of titanium oxide SMT5103™ and 0.3 percent of zinc stearate.

The images were then fused using the Xerox DC2006 printer which contains no oil on the fuser rolls. The toners of Examples XIII to XVIII displayed hot offset temperatures (HOT) between about 150° C. and about 160° C.; acceptable gloss, for example about or in excess of 50 ggu (Gardener gloss units), was achieved, the minimum fix temperatures was about 135° C. to about 140° C. for all toners.

Other embodiments and modifications of the present invention may occur to those skilled in the art subsequent to a review of the information presented herein; these embodiments and modifications, equivalents thereof, substantial equivalents thereof, or similar equivalents thereof are also included within the scope of this invention.

What is claimed is:

1. A toner comprised of colorant and a sulfonated polyester-siloxane polymer generated from the reaction of at least one organic diol monomer, at least one organic diacid or at least one diester monomer, at least one carbinol carboxy terminated polydimethyl siloxane, and at least one ion salt of a sulfonate difunctional monomer.

2. A toner in accordance with claim 1 wherein said colorant is a pigment.

3. A toner in accordance with claim 1 wherein said colorant is a dye.

4. A toner in accordance with claim 1 wherein said colorant is comprised of a mixture of a pigment and a dye.

5. A toner in accordance with claim 1 wherein said polymer is copoly(1,2-propylene terephthalate-co-diethylene terephthalate)-copoly(1,2-propylene 5-sulfoisophthalate-co-diethylene 5-sulfo-isophthalate)-copolydimethylsiloxane, copoly(dipropylene terephthalate-co-diethylene terephthalate)-copoly(dipropylene 5-sulfoisophthalate-co-diethylene 5-sulfo-isophthalate)-copolydimethylsiloxane, copoly(1,2-propylene terephthalate)-copoly(1,2-propylene 5-sulfoisophthalate)-copolydimethylsiloxane, and copoly(dipropylene terephthalate)-copoly(dipropylene 5-sulfoisophthalate)-copolydimethylsiloxane.

6. A toner in accordance with claim 1 wherein said polymer is represented by the following randomly chemically attached segments

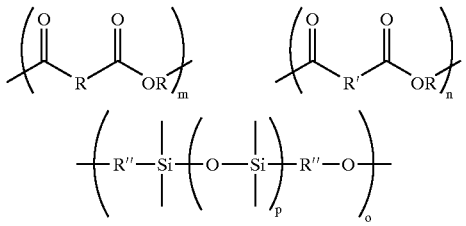

wherein the segments m, n and o represent the random units of the polymer and wherein the sum of m, n, and o is from about 10 to about 10,000; p represents the repeating segment of the polydimethyl siloxane, and is from about 100 to about 10,000 units; R is an alkylene; R' is a hydrogen atom, an alkali arylenesulfonate or an alkali alkylene-sulfonate, and R" is an alkylene.

7. A toner in accordance with claim 6 wherein said alkylene contains from about 1 to about 18 carbon atoms; and said oxyalkylene possesses a carbon chain length of from about 2 to about 36 carbon atoms.

8. A toner in accordance with claim 2 wherein R' is an alkali arylene sulfonate or an alkali alkylene sulfonate of the formulas

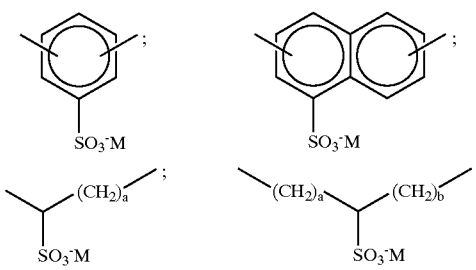

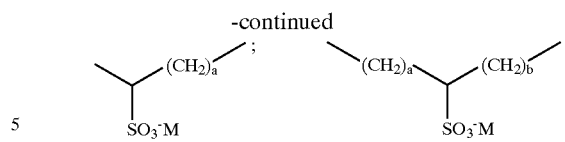

wherein a and b are numbers of from about 1 to about 4, and M is hydrogen, an alkali (I) metal of lithium, sodium, potassium, rubidium, cesium, an alkali (II) metal of beryllium, magnesium, calcium, strontium or barium, a metal of (II), iron (III), aluminum (III), or copper (I), and R" is ethylene, propylene or butylene.

11. A toner in accordance with claim 1 wherein said polyester siloxane is selected from the group consisting of copoly(1,2-propylene terephthalate-co-diethylene terephthalate)-copoly(1,2-propylene 5-sulfoisophthalate-co-diethylene 5-sulfo-isophthalate)-copolydimethyl siloxane, copoly(dipropylene terephthalate-co-diethylene terephthalate)-copoly(dipropylene 5-sulfoisophthalate-co-diethylene 5-sulfo-isophthalate)-copolydimethylsiloxane, copoly(1,2-propylene terephthalate)-copoly(1,2-propylene 5-sulfoisophthalate)-copolydimethylsiloxane, and copoly(dipropylene terephthalate)-copoly(dipropylene 5-sulfoisophthalate)-copolydimethylsiloxane.

12. A toner comprised of a colorant and a sulfonated polyester siloxane copolymer resin generated from the reaction of at least one organic diol monomer, at least one organic diacid monomer, at least one carbinol carboxy terminated polydimethylsiloxane, and at least one ion salt of a sulfonate difunctional monomer.

13. A toner comprised of a colorant and sulfonated polyester siloxane copolymer resin generated from the reaction of an organic diol monomer, an organic diester monomer, a carbinol carboxy terminated polydimethylsiloxane, and an ion salt of a sulfonate difunctional monomer.

wherein a and b are numbers of from about 1 to about 5, and M is hydrogen, an alkali metal of lithium, sodium, potassium, rubidium, cesium, beryllium, magnesium, calcium, strontium and barium, or a metal of zinc (II), iron (III), aluminum (III), or copper (I).

9. A toner in accordance with claim 8 wherein the ion salt of the sulfonate difunctional monomer is the hydrogen, lithium, sodium, potassium, cesium, rubidium, magnesium, barium, calcium or beryllium, zinc, zirconium, vanadium, copper, or aluminum salt of dimethyl-5-sulfo-isophthalate, dialkyl-5-sulfo-isophthalate4-sulfo-1,8-naphthalic anhydride, 4-sulfo-phthalic acid, 4sulfo-phenyl-3,5-dicarbomethoxybenzene, 6-sulfo-2-naphthyl-3,5-dicarbomethoxybenzene, sulfo-terephthalic acid, dimethyl-sulfo-terephthalate, dialkyl-sulfo-terephthalate, sulfo-ethanediol, 2-sulfo-propanediol, 2-sulfo-butanediol, 3sulfopentanediol, 2-sulfo-hexanediol, 3-sulfo-2-methylpentanediol, N,N-bis(2-hydroxyethyl)-2-aminoethane sulfonate, or 2-sulfo-3,3-dimethylpentanediol, sulfo-p-hydroxybenzoic acid.

10. A toner in accordance with claim 2 as represented by the following chemically bonded random segments

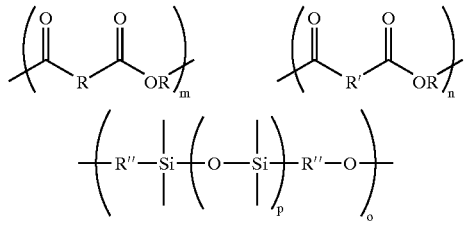

wherein the segments m, n and o represent the random units of the polymer and wherein the sum of m, n, and o is from about 500 to about 4,000; p represents the repeating segment of the polydimethylsiloxane and is from about 1,000 to about 7,000 units; R is an alkylene; R' is an alkali arylene-sulfonate of phenylenesulfonate, isophthalylene-5-sulfonate, terephthalylene-sulfonate phthalylene-sulfonate, or an alkali alkylene-sulfonate of propylene-sulfonate, butylene-sulfonate, pentylene-sulfonate, hexylene-sulfonate of the formulas

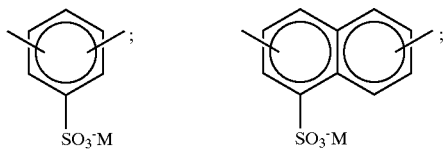

14. A toner in accordance with claim 1 wherein at least one is from 1 to about 25.

15. A toner in accordance with claim 1 wherein at least one is from 1 to about 10.

16. A toner in accordance with claim 1 wherein at least one is from 1 to about 5.

17. A developer comprised of the toner of claim 1 and carrier.

18. A developer in accordance with claim 17 wherein said carrier is comprised of a core and a coating thereover.

19. A developer in accordance with claim 17 wherein said carrier is comprised of a ferrite.

20. A developer in accordance with claim 17 wherein said carrier is comprised of a core with at least one polymer coating thereover.

21. A developer in accordance with claim 20 wherein at least one is from about 1 to about 5.

22. A toner in accordance with claim 1 wherein there is selected an organic diacid monomer.

23. A toner in accordance with claim 1 wherein there is selected a diester monomer.

24. A toner in accordance with claim 1 wherein said polyester siloxane is copoly(1,2-propylene terephthalate-co-diethylene terephthalate)-copoly(1,2-propylene 5-sulfoisophthalate-co-diethylene 5-sulfo-isophthalate)-copolydimethyl siloxane.

25. A toner consisting essentially of a colorant and a sulfonated polyester siloxane polymer.

* * * * *